W. T. MILLAR.
CULTIVATOR.
APPLICATION FILED JUNE 26, 1915.

1,218,681.

Patented Mar. 13, 1917.
2 SHEETS—SHEET 1.

INVENTOR
W.T. MILLAR

WITNESSES

BY Featherstonhaugh & Co
ATT'YS.

W. T. MILLAR.
CULTIVATOR.
APPLICATION FILED JUNE 26, 1915.

1,218,681.

Patented Mar. 13, 1917.
2 SHEETS—SHEET 2.

WITNESSES

INVENTOR
W. T. MILLAR

BY Fetherstonhaugh & Co
ATTYS.

UNITED STATES PATENT OFFICE.

WILLIAM THOMAS MILLAR, OF ARNPRIOR, ONTARIO, CANADA.

CULTIVATOR.

1,218,681.   Specification of Letters Patent.   Patented Mar. 13, 1917.

Application filed June 26, 1915. Serial No. 36,585.

*To all whom it may concern:*

Be it known that I, WILLIAM THOMAS MILLAR, a subject of the King of Great Britain, and resident of Arnprior, in the Province of Ontario, Dominion of Canada, have invented certain new and useful Improvements in Cultivators, of which the following is the specification.

This invention relates to improvements in cultivators and the objects of the invention are to effectively pulverize plowed land, particularly that part between adjacent furrows, and to facilitate in removing perennials such as scutch grass, thistles and the like, this part of my invention being claimed in my divisional application No. 73,990, filed Jan. 24, 1916. Further objects are to simplify the construction of the machine and permit of the frame carrying the pulverizing element being elevated or lowered to suit the depth of ground to be broken and generally to adapt the several parts to better perform the functions required of them.

With the above objects in view, the invention consists essentially of the improved construction particularly described and set forth in the following specification and accompanying drawings forming part of the same.

In the drawings.

Like characters of reference refer to like parts in the several figures.

Figure 1:
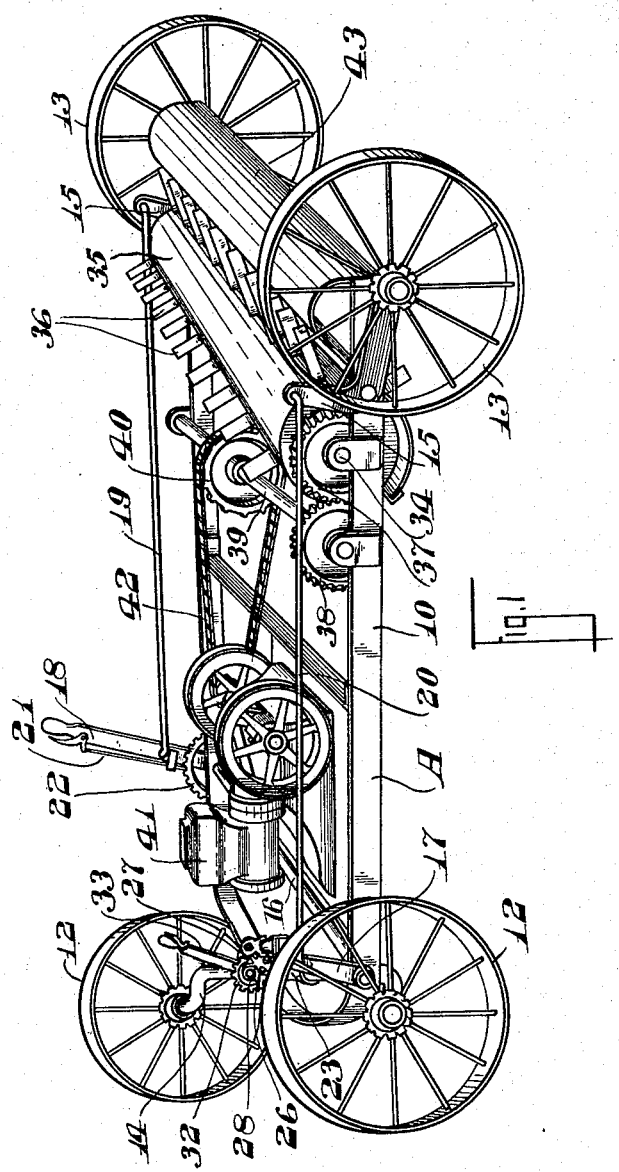
Figure 1 is a perspective view of the improved cultivator.
Figure 2:
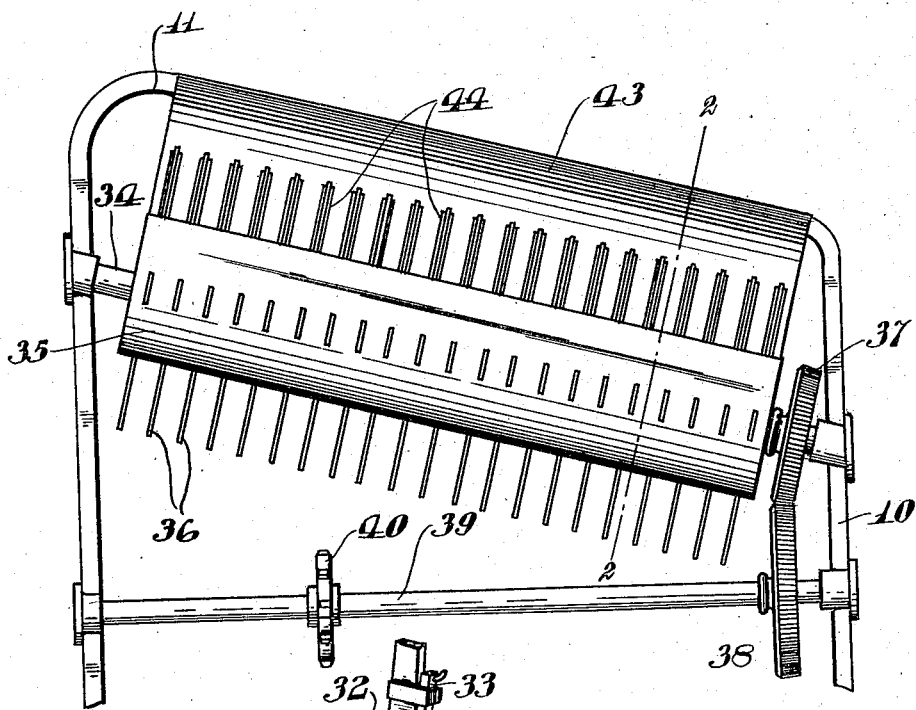
Fig. 2 is a fragmentary plan view of the frame showing the location of the pulverizing element.
Figure 3:
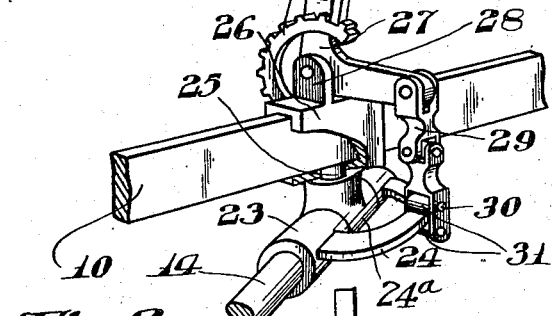
Fig. 3 is a fragmentary perspective view of the frame and front axle showing the means for adjusting the latter.
Figure 4:
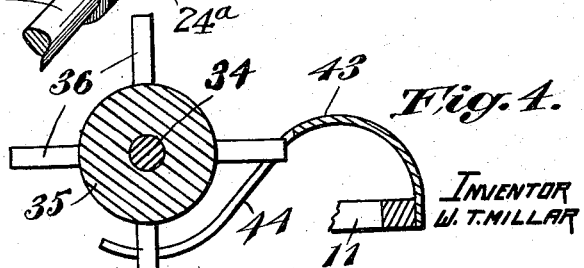
Fig. 4 is a transverse section on the line 2—2 of Fig. 2.

Referring to the drawings, A represents the improved cultivator comprising the frame 10 carrying the several parts operatively mounted thereon and having its transversely extending rear member 11 angularly disposed to the sides. This frame is supported by front and back wheels 12 and 13 adapted to run along the ground, the former being rotatably mounted on the front axle 14, the ends of which are bent in the form of cranks, while the latter are rotatably mounted on the cranks 15 pivotally mounted on opposite sides of the frame.

The cranks 15 are designed to be simultaneously operated to elevate and lower the frame 10 and to this end I provide a transversely extending shaft 16 rotatably mounted on the front of the frame and provided at one end with a crank arm 17, the other end carrying a hand lever 18 connected through the medium of the link 19 to the crank 15 while the crank arm 17 is connected by the link 20 with the crank arm 15 on that side of the machine remote from the said lever. The lever 18 is fitted with a slidably mounted detent 21 coacting with the quadrant 22 carried by the frame, thereby retaining the cranks 15 in any desired position.

The front axle 14 is provided intermediate of its length with a pair of sleeves 23 rigidly mounted thereon and connected by a curvilinear sway-bar 24 and embracing a sleeve 24ᵃ loosely mounted on the said axle and carrying a king pin 25 rotatably engaging the bracket 26 mounted on the front of the frame. While the front axle 14 is capable of being rotated in a horizontal plane about the king pin, it is also capable of being rotated in a vertical plane about its crank ends thereby elevating the front of the frame, and to facilitate in obtaining this result a bell crank lever 27 is pivotally mounted to the lugs 28 formed integral with the bracket 26, the longer arm of the lever being vertically disposed and adapted to be manually actuated while the shorter arm is connected through the links 29 and 30 to the curvilinear sway bar.

These links are preferably connected by a universal joint, thereby permitting of the front axle 14 being simultaneously rotated in a horizontal and vertical plane without in any way impairing its function.

In the embodiment illustrated the lower link 30 is provided with rollers 31 rotatably mounted therein and adapted to engage with the upper and lower faces of the curvilinear sway bar 24 thereby minimizing the friction and permitting of an easy actuation of the front axle.

To permit of the front axle 14 being retained in position after adjustment by the lever 27, a quadrant 32 is attached to the bracket 26 and designed to coact with the detent 33 slidably mounted on the said lever.

Located adjacent to the rear end of the frame 10 and rotatably mounted thereon is an angularly disposed shaft 34 carrying a drum 35 provided with a plurality of radially extending knives 36 adapted to pulverize the ground in a manner to be made clear hereafter.

The shaft 34 carries a beveled pinion 37 rigidly mounted thereon and adapted to mesh with the beveled pinion 38 carried by the transversely extending shaft 39 rotatably mounted on the frame, the said shaft being further provided intermediate of its ends with a sprocket wheel 40 designed to be operatively connected to the prime mover 41 through the medium of the chain 42.

The prime mover may be of any usual type such as an internal combustion engine, electric motor or the like and is adapted to be mounted on the frame in such a position that it is at all times under the control of the driver.

It is essential that the knives 36 should be effectively cleaned during rotation and to this end a cleaning element 43 of substantially S-shape in cross section is mounted on the rear member 11 of the frame 10, the said element being provided with a plurality of slots 44 therein adapted to engage any soil adhering to the knives 36 and facilitate in removing the same.

A suitable type of steering mechanism may be provided to effectively control and guide the front wheels 12.

In the operation of the cultivator the lever 18 is operated so that the frame 10 is adjusted to the required height permitting of the knives 36 to engage the soil to the required depth, the frame being held in the desired position through the medium of the detent 21 engaging with the quadrant 22. The prime mover 41 is then started, the motion being transmitted through the chain 42 to the shaft 39 which in turn through the medium of the beveled pinion 38 meshing with the beveled pinion 37 rotates the shaft 34 transmitting the rotary motion to the drum 35 and knives mounted thereon.

It will be clear that in this operation any perennials engaged by the knives 36 will be uprooted and that during the rotary motion of the drum such roots and grasses will be disengaged from the knives through the medium of the slots 34 in the cleaning member.

Should it be found advisable at any time to further adjust the frame, this may be effected by the manual operation of the lever 27 whereby the axle 14 is rotated to elevate or lower the frame 10, the said axle being retained in the desired position by engaging the detent 33 with the quadrant 32.

The function of making the cleaning element 43 S-shaped is to eliminate any undue friction which would otherwise occur when the frame is lowered to permit of the pulverizing element deeply engaging the ground. It will be understood that by having the outer surface of the cleaning element curved that the same is permitted to slide easily over the ground without in any way putting undue load on the machine.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. In a cultivator and in combination, a frame, a front axle operatively connected to the frame and provided with crank ends, wheels rotatably mounted on the crank ends, sleeves rigidly mounted on the front axle intermediate of its length, a sway bar carried by the sleeves, and a pivotally mounted bell crank lever operatively connected to the sway bar.

2. In a cultivator and in combination, a frame, a front axle operatively connected to the frame and provided with crank ends, wheels rotatably mounted on the crank ends, sleeves rigidly mounted on the front axle intermediate of its length, a sway bar carried by the sleeves, a pivotally mounted bell crank lever operatively connected to the sway bar, a sleeve embraced by the said sleeves and loosely mounted on the axle, and a king pin operatively connecting the second said sleeve and the frame.

In witness whereof I have hereunto set my hand in the presence of two witnesses.

WILLIAM THOMAS MILLAR.

Witnesses:
KATIE DOLAN,
JEAN GIROWARD.

Copies of this patent may be obtained for five cents each, by addressing the "Commissioner of Patents, Washington, D. C."